(12) United States Patent
Gamperling et al.

(10) Patent No.: US 11,448,903 B2
(45) Date of Patent: Sep. 20, 2022

(54) METHOD FOR CORRECTING CENTERING PARAMETERS AND/OR AN AXIAL POSITION AND CORRESPONDING COMPUTER PROGRAM AND METHODS

(71) Applicant: Carl Zeiss Vision International GmbH, Aalen (DE)

(72) Inventors: Michael Gamperling, Leipheim (DE); Tobias Breuninger, Riederich (DE); Jesús-Miguel Cabeza-Guillén, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/728,147

(22) Filed: Dec. 27, 2019

(65) Prior Publication Data

US 2020/0218095 A1 Jul. 9, 2020

Related U.S. Application Data

(63) Continuation of application No. PCT/EP2018/067409, filed on Jun. 28, 2018.

(30) Foreign Application Priority Data

Jun. 28, 2017 (EP) .................... 17178326

(51) Int. Cl.
*G02C 13/00* (2006.01)
*G06F 30/12* (2020.01)
*G06F 111/02* (2020.01)

(52) U.S. Cl.
CPC ........... *G02C 13/005* (2013.01); *G06F 30/12* (2020.01); *G06F 2111/02* (2020.01)

(58) Field of Classification Search
CPC .... G02C 13/005; G06F 30/12; G06F 2111/02
(Continued)

(56) References Cited

U.S. PATENT DOCUMENTS 6,692,127 B2 * 2/2004 Abitbol ............... G02C 13/005
351/227
7,740,355 B2 6/2010 Sessner et al.
(Continued)

FOREIGN PATENT DOCUMENTS

CN 103842894 A 6/2014
DE 102004063160 A1 7/2006
(Continued)

OTHER PUBLICATIONS

"Ophthalmic optics—Spectacle lenses—Vocabulary (ISO 13666:2012)," German and English version EN ISO 13666:2012, Oct. 2013.
(Continued)

*Primary Examiner* — Andre Pierre Louis
(74) *Attorney, Agent, or Firm* — Tautz & Schuhmacher LLC; Georg Hasselmann

(57) ABSTRACT

Methods and devices for correcting centering parameters and/or an axial position of a spherocylindrical refraction on the basis of a habitual head position are disclosed. A representation of the head of a user in a head posture or a representation of the head with a spectacle frame in a spectacle frame alignment are displayed. To correct the spectacle parameter based on a corrected head posture and/or a corrected spectacle frame alignment, the corrected head posture and/or the corrected spectacle frame alignment is determined by at least partially manually correcting a head posture in the displayed representation of the head and/or of the spectacle frame alignment in the displayed representation of the head with the spectacle frame. A representation
(Continued)

of the head of a user is shown on a display, thereby allowing intuitive adjustment of a habitual head position.

19 Claims, 9 Drawing Sheets

(58) Field of Classification Search
USPC .......................................................... 703/10
See application file for complete search history.

(56) References Cited

U.S. PATENT DOCUMENTS

| | | | |
|---|---|---|---|
| 8,840,247 B2 | 9/2014 | Kratzer et al. | |
| 9,033,496 B2 | 5/2015 | Divo et al. | |
| 9,500,885 B2 | 11/2016 | Kubitza et al. | |
| 10,564,446 B2 | 2/2020 | Nieuwenhuis et al. | |
| 2006/0044509 A1 | 3/2006 | Fluegge et al. | |
| 2007/0035697 A1 | 2/2007 | Ross-Messemer et al. | |
| 2012/0182521 A1* | 7/2012 | Kubitza | A61B 5/0077 351/204 |
| 2015/0055085 A1* | 2/2015 | Fonte | H04N 5/23219 351/178 |
| 2016/0242641 A1* | 8/2016 | Liang | G02C 7/02 |

FOREIGN PATENT DOCUMENTS

| | | |
|---|---|---|
| DE | 102008018198 A1 | 10/2009 |
| DE | 102009025215 A1 | 12/2010 |
| EP | 1844363 B2 | 12/2015 |
| EP | 3355100 A1 | 8/2018 |
| EP | 3355104 A1 | 8/2018 |
| WO | 2010097161 A1 | 9/2010 |
| WO | WO-2017149335 A1 * | 9/2017 ............. G02C 7/061 |

OTHER PUBLICATIONS

I.Terminal® 2—Quick Guide, Mar. 31, 2015.
International Search Report issued in PCT/EP2018/067409, to which this application claims priority, and English-language translation thereof, dated Sep. 17, 2018.
International Preliminary Examination Report issued in PCT/EP2018/067409, to which this application claims priority, and English-language translation thereof, dated Oct. 21, 2019.
Office action by the Chinese Patent Office issued in CN201880056354.4, which is a counterpart hereof, dated Sep. 18, 2020, and English-language translation thereof.

* cited by examiner

METHOD FOR CORRECTING CENTERING PARAMETERS AND/OR AN AXIAL POSITION AND CORRESPONDING COMPUTER PROGRAM AND METHODS

CROSS REFERENCE TO RELATED APPLICATIONS

This application is a continuation application of international patent application PCT/EP2018/067409, filed Jun. 28, 2018, designating the United States and claiming priority from European patent application 17178326.9, filed Jun. 28, 2017, and the entire content of both applications is incorporated herein by reference.

TECHNICAL FIELD

The present application relates to methods for correcting centration parameters and/or an axis position on the basis of a habitual head posture of a person, a corresponding computer program, and a corresponding apparatus.

BACKGROUND

Centration parameters are parameters that are needed to correctly arrange, that is to say center, spectacle lenses in a spectacle frame such that the spectacle lenses are worn in a correct position relative to the person's eyes.

Examples of such centration parameters comprise the interpupillary distance, the vertex distance, the face form angle, the y coordinates of the left and right centration points (also designated as the fitting point height), the distance visual point, the pantoscopic angle, and further parameters defined in section 5 of DIN EN ISO 13666:2012 and, among other things, the inclination of the frame.

The inclination indicates an angle between the plane of the spectacle earpiece and the frame plane. It is linked to the pantoscopic angle but, in contrast to the latter, is independent of the wearing position of the spectacles on the head.

These centration parameters are nowadays determined automatically or semi-automatically with the aid of suitable systems. An example of such a system is described in EP 1 844 363 B2. The latter document specifies using a pair of image-recording devices to generate stereo image data of a person's head or parts of the head. A three-dimensional model of the head is then calculated from the stereo image data. Desired centration parameters can be determined on the basis of the three-dimensional model. Further apparatuses for determining centration parameters are known from US 2007/0035697 A1 or US 2006/0044509 A1.

The centration parameters depend on a habitual head posture of the person during use of the spectacles. For example, a pronounced inclination of a person's head leads to a higher distance visual point than if a head is held upright. The habitual head posture is the head posture that the person normally adopts when wearing the spectacles.

It is therefore important, when determining the centration parameters, that the person adopts their habitual head posture. When using older systems for determining centration parameters, the distance from the person to the image-recording devices is quite considerable, for example greater than 4 m, which facilitates the adoption of a natural posture and additionally ensures that the person does not fix their gaze on near points. However, this considerable distance from the image-recording devices is no longer desirable nowadays, so as to be able to carry out the determination of the centration parameters within a smaller space. In the meantime, there are even hand-held systems for determining the centration parameters, where the large viewing angles of the cameras built into such systems dictate that the distance from the person must be very short, in order to ensure sufficient resolution of the face in the image (for example in the region of 30 cm). In standing appliances too, work is carried out at distances of 1 m or less.

In an apparatus recently developed by the applicant, centration parameters are determined using a large number of cameras arranged at a distance of about 25 cm in an arc shape around the person's head. This apparatus is described in the European patent publication EP 3355100. Here, the camera arrangement even encircles the head of the person who is to be tested.

For many, this proximity of the cameras to the person to be examined and to the person's head leads to an unnatural head posture, in particular a more upright head posture (standing at attention). Centration parameters determined in such a position differ from centration parameters that would be reasonable for the habitual head posture of the person.

There are various approaches available to solve this problem. For example, DE 10 2004 063 160 A1 discloses a method in which an angle at which the head is inclined forward, starting from an upright position, is detected via a plurality of image recordings. A head posture is determined from the plurality of image recordings.

DE 10 2008 018 198 A1 describes measurement of the habitual head posture by recording images over a fairly long period of time prior to the centration measurement. This habitual head posture determined by analysis can then be compared to the one at the time the images were taken in order to determine the centration parameters, and a correction of centration parameters can then be carried out.

A similar method is also disclosed in DE 10 2009 025 215 A1. Here, a person's head posture is likewise measured continuously in order to determine a habitual head posture, and centration parameters are then determined on the basis of the habitual head posture thus identified. In both DE 10 2008 018 198 A1 and DE 10 2009 025 215 A1, the head posture therefore has to be observed and evaluated over a fairly long period of time.

WO 2010097161 A1 discloses a method for determining the center of rotation of the eye, in which method a reference structure of an eye is detected in two measurement situations, and a rotation of the eye between the measurement situations is then taken into consideration in prescribing a spectacle lens. In particular, account can here be taken of differences of a viewing direction in a refraction measurement with a phoropter and in a centration measurement.

In the appliance described in the document "i.terminal 2 quick guide" www.zeiss.com/content/dam/Vision/Vision/International/Pdf/en/dti/EN_20_070_73001_QG_i-Terminal-2_31-03-15.pdf, Mar. 31, 2015, a head posture identified in image recordings for determination of centration parameters is corrected to a previously defined head posture by input of a setpoint angle. This correction is quite abstract and requires considerable experience, since only numerical values are predefined. The nature of the correction and determination of the habitual head posture is comparatively time-consuming and in some cases difficult to manage, since additional measurements are carried out that also have to be evaluated.

Another approach used by opticians, often on the basis of experience, is to manually shift a marking applied in the form of a stamp image according to section 7.2 of DIN EN ISO 8980-2:2004. This stamp image provides information on spectacle lenses, such as a marking for the alignment, a marking for the distance reference point, a marking for the near reference point, a marking for the fitting point, and a marking for the prism reference point. A shift of this stamp image in a vertical direction corresponds to a change of the head posture while the viewing direction is maintained at the same time, or a change of the viewing direction while the head posture is fixed. The situation is similar in the shifting of the near zone. Here too, the inclination of the head when reading is changed implicitly by the shift. This approach requires great experience, since it is not possible to intuitively assess how far the shift of the stamp image actually matches a defined head posture.

A related problem arises, for example, when determining a persons' spherocylindrical refraction by means of a phoropter or autorefractor. The values determined in the spherocylindrical refraction indicate the sight defect of a person and, in accordance with the standard DIN EN ISO 13666:2012, are given for each eye as sphere (11.2 of this standard), cylinder (12.5 of this standard) and axis position (12.6 of this standard). Phoropters or autorefractors are conventional appliances for determination of these values.

With these appliances, the head of the person to be examined is positioned in an upright posture, and the cylinder, axis and sphere values are determined. However, these values are only exactly accurate if, during use of the spectacles, the person also wears the spectacles in the intended arrangement in front of the eye and with the intended head posture. If the spectacle frame is inclined during use, for cosmetic, anatomical or other reasons, or if the person habitually inclines their head to the side, the determined values are not accurate.

SUMMARY

It is an object of the present disclosure to make available a simple, quick, and intuitive possibility of correcting deviations in spectacle parameters, such as centration parameters or an axis position, which deviations arise from a head posture or spectacle position in normal use that has changed by comparison with a measurement of the centration parameters or axis position. It is furthermore an object of many aspects of the present disclosure to make available specific and advantageous implementations that support such a correction.

To this end, according to the disclosure, a computer-implemented method, a computer program, a computer-readable storage medium, a data carrier signal, and an apparatus for correcting a spectacle parameter are made available. Further, exemplary embodiments are discussed below. Finally, a method for producing spectacle lenses using spectacle parameters corrected by the methods according to the disclosure is also made available.

According to the disclosure, in a first aspect, a computer-implemented method for correcting centration parameters or an axis position is made available, comprising:
    displaying a representation of the head in a head posture or a representation of the head with a spectacle frame in a spectacle frame alignment, and
    correcting the spectacle parameter on the basis of a corrected head posture and/or on the basis of a corrected spectacle frame alignment,
    characterized in that the corrected head posture and/or the corrected spectacle frame alignment is determined by:
    at least partially manual correction of the head posture in the displayed representation of the head and/or of the spectacle frame alignment in the displayed representation of the head with the spectacle frame.

By the representation of the head, an intuitive and simple correction of the head posture or of the spectacle position can be permitted, in particular a manual correction by a user such as an optician. In other words, in the method according to the disclosure, and in contrast to the related art, for example as disclosed in DE 10 2008 018 198 A1 or in DE 10 2009 025 215 A1, the representation of the head provides a visual aid so as to be able to manually carry out the correction in an intuitive and simple manner wholly or partially in the displayed representation. Here, "manually" signifies that a user makes suitable inputs. The method is partially manual when, although inputs are made for the correction, the correction also proceeds partially automatically. Such inputs can be, for example, the marking of points or regions in the displayed representation of the head, an input of numerical values, or movement of the displayed representation of the head or of other displayed elements, as will be explained in greater detail later.

In the following, "person" is understood as the person for whom spectacles are adapted. "User" signifies someone who uses the method in order to adapt the spectacles, typically an optician.

A spectacle parameter is to be understood as any kind of parameter that describes spectacles (including spectacle frame and spectacle lens) and/or that is required in order to adapt the spectacles to a person. Examples of spectacle parameters comprise centration parameters or the spherocylindrical refraction for the spectacle lenses, in particular an axis position.

In the context of the present application, a representation of the head is to be understood as a two-dimensional or three-dimensional display of a head or part thereof. A three-dimensional display is a display which creates a spatial impression for the observer, for example through a suitable perspective display. A two-dimensional display can be, for example, a schematic line drawing.

The representation of the head is displayed to the user. The display can take many forms.

For example, it can be shown on a screen. A projection onto a wall, for example, is also possible.

Such a representation of the head can be created comparatively realistically on the basis of one or more images of the person to whom the spectacles are adapted, or it can also be a rather schematic line drawing, as long as the position of the head and/or of a spectacle frame on the head is clearly identifiable. A three-dimensional display can, for example, take the form of an avatar, i.e., a graphical representation of a real person. In such a three-dimensional display of a 3D head representation, the correction of the head posture then comprises an alignment of the displayed 3D representation. In this case, the user is able to choose the viewing direction from which the 3D display is shown, which has the advantage that a user, for example an optician, can choose the view that he finds most convenient.

In other exemplary embodiments, and in a further aspect, a side view or two side views (from left and right) of the head are displayed, wherein a vertical head inclination can be identified most easily and most intuitively on a side view. The representation of the head shows the head as it was held in a centration measurement and/or refraction measurement. Such a representation of the head can be created, for example, on the basis of images of the kind recorded in the determination of the centration parameters according to the abovementioned European patent publication EP3355100. First of all, the head posture is displayed that is based on defined centration parameters and/or refraction values. The correction is then made proceeding from this posture. The user can thus easily identify whether this initially displayed posture corresponds to a habitual head posture of the person that has been observed by the user.

A spectacle frame alignment is to be understood here as a position of the spectacle frame compared to a position in which the spectacles are worn horizontally on the head with the latter in an upright posture, and, accordingly, the distance visual points for the right eye and left eye are arranged at the intended positions in relation to the respective eye, i.e., positions that derive from a centration measurement prior to the correction. The spectacle frame alignment can be indicated as the direction of the frame horizontal. The frame horizontal corresponds to a horizontal direction of the spectacle frame and can be given, for example, by a tangent to an upper frame edge of the spectacle frame.

In one exemplary embodiment, a habitual head posture, in particular a vertical head inclination, can be adjusted by a user with the aid of the displayed representation of the head. The vertical head inclination here designates an inclination angle by which the head is inclined forward starting from an upright head posture. There are several possibilities for doing this, all of them offering intuitive setting.

In a first variant, an input possibility is provided by which the user can move the indicated representation of the head, in particular the abovementioned side view, directly to a desired head posture. The head posture thus set is then adopted, for example, as a habitual head posture and is used to correct the centration parameters. The user, for example an optician, can in this way easily set the head inclination according to a previously observed habitual head posture of the person.

In another exemplary embodiment and another aspect, a vertical head inclination can be input directly, and the indicated representation of the head is modified according to the inclination angle that is input. It is thus also possible to assess intuitively whether the inclination angle that is input actually agrees with the inclination angle in the desired, e.g., habitual, head posture of the person.

In another exemplary embodiment, a front view of the head is merged together with positions of the distance visual points (and optionally also the near visual points), for example in the form of a stamp image. The position of the distance visual points, near visual points and/or stamp image can then be altered manually. In this alteration, a side view of the head is then at the same time tilted through a corresponding vertical head inclination, such that once again an intuitive setting is possible by means of the user bringing the side view into line with the desired head posture, e.g., the actual head posture, in particular the habitual head posture of the person observed by the user.

In addition to the vertical head inclination, a lateral head inclination can also be shown correspondingly. A lateral head inclination is understood as a head inclination in the direction of the ears, i.e., to the right or left in the front view. In another aspect, this can be effected in particular on the basis of a three-dimensional display or on the basis of a front view in the displayed representation of the head. For this purpose, the front view can be displayed with the spectacle frame, and the spectacle frame alignment can be marked as frame horizontal. On the basis of the inclination of the frame horizontal with respect to a horizontal direction of the displayed representation of the head, the axis position can then be corrected, which will now be explained in brief.

The situation is that, in the case of a slight lateral inclination of the head, the eyeballs "roll" in opposite directions about the axis of the viewing direction, i.e., they maintain their alignment with respect to a vertical direction in space.

In the determination of the spherocylindrical refraction, the persons' head is positioned in an upright posture, as was explained at the outset. For fitting the lenses in the spectacle frame, an optician usually uses the frame horizontal of the spectacle frame as a guide. If the person's head, with the spectacles in place, is not held upright in the habitual head posture but is instead inclined to the side, then the spectacles are also inclined to the side. Since the eyes compensate for the lateral inclination of the head, as explained above, at least in the case of small lateral inclinations, the lenses are rotated in relation to the horizontal direction of the eyes. The result of this is that the axis of the cylindrical correction of the spectacle lenses is not rotated by the angle of the lateral inclination with respect to the refraction situation.

In order again to compensate for this angle, the axis position is then corrected by a corresponding angle. In this way, deviations arising from the lateral head inclination and therefore from the spectacle frame alignment are thus compensated, such that the axis position is aligned correctly to the eye.

In order to correct the axis position, a front view of the head can therefore be used as a displayed representation of the head, and the lateral inclination of the head can be set, as described above, for a desired, i.e., habitual, head posture. Assuming that the angle of the lateral inclination of the head is zero during the refraction measurement in a phoropter and/or autorefractor, a correction of the axis position can be determined that corresponds to the angle of the lateral inclination of the head.

In an alternative exemplary embodiment and a further aspect, an image of the irises of both eyes can be created in an autorefractor during the autorefraction, and, in the subsequent creation of images for determining the centration parameters, images of the irises of both eyes are likewise plotted. For both eyes, the irises are registered with respect to each other from both images, i.e., their relative position or relative rotation of the eyes between the autorefraction and the determination of the centration parameters are found. From this, a correction of the axis position likewise takes place about the corresponding angle of the relative rotation. The images can be easily recorded during the autorefraction and the centration measurement, such that in this way the axis correction angle can likewise be easily set. This approach can in particular also be used on non-symmetrical faces, in which a correction by the above method on the basis of the frame horizontal and lateral head inclination may be difficult. This alternative exemplary embodiment can also be implemented fully automatically without manual intervention.

In a further exemplary embodiment and a further aspect, one or more images of the person are recorded with an image-recording device, wherein for this purpose the person is not necessarily present in front of an apparatus for centration measurement but instead can move substantially freely. For example, the internal camera of a smart phone or tablet, or a camera specially designed for the purpose, can be used to record the images. Thus, the person's head can be recorded in a substantially habitual head posture.

In one variant, the images thus recorded are indicated in addition to the displayed representation of the head, which makes the abovementioned setting easier for the user, since they can then directly compare the head posture of the displayed representation of the head, for example in a determination of spectacle parameters such as in the centration measurement or the refraction measurement, with the head posture in the images. This further facilitates the setting of the desired, in particular habitual head posture.

In another exemplary embodiment, prominent points are sought in the recorded images or the recorded image and in the displayed representation of the head, and, by comparing them, angles are determined by which the desired head inclination, i.e., in particular the habitual head inclination, deviates from the head inclination in the displayed representation of the head. The method can be automated in this way.

The above-explained correction and setting of the representation of the head to the habitual head posture can be performed for various situations, for example when the person is looking into the distance, when working on a screen, or when reading a magazine. In the above variant in which images of the person are recorded, the person can be instructed to perform corresponding activities such that corresponding images can be recorded.

Moreover, a shift of the near visual point or of the near portion of the stamp image can be transposed to a change of the vertical head inclination or the viewing direction, which is then made visible in the side view of the displayed representation of the head. In other words, a shift of the near visual point or of the near portion corresponds to a modified head inclination, which is then accordingly displayed in the representation. On the basis of this change of the vertical head inclination, it is then possible, as in the direct setting of the vertical head inclination, to effect a correction of the spectacle parameters with the aid of the representation of the head.

The correction of the centration parameters can then be carried out by simple geometric calculations on the basis of the determined and desired, i.e., typically habitual, head posture, for example in the manner described in document DE 10 2008 018 198 A1 or DE 10 2009 025 215 A1. For this purpose, it is particularly helpful to detect the position of the pupils and of the corneal apex of the eyes and then to derive the center point (rotation point) of the eyes, for example by model-based assumptions. These can then be used to correct the viewing direction before determining the visual points in the spectacle lens. In a number of exemplary embodiments, these points can also be determined anyway in the determination of the centration parameters.

According to a further aspect, a computer program is made available which is stored, for example, in a non-transitory memory of a computer and which has a program code. If the program code is executed on one or more processors of the computer, the method is carried out as described above.

According to a further aspect, a computer is made available with a processor on which this computer program runs in order to carry out the above-described methods. The computer program is stored in a memory of the computing device.

Thus, the method can be easily implemented by suitable programming of a computer.

According to a further aspect, an apparatus for correcting a spectacle parameter is made available, comprising:
display means for displaying a representation of the head in a head posture or a representation of the head with a spectacle frame in a spectacle frame alignment, and
correction means for correcting the spectacle parameter on the basis of a corrected head posture and/or on the basis of a corrected spectacle frame alignment,
characterized by input means for determining the corrected head posture and/or the corrected spectacle frame alignment by:
at least partial manual correction of the head posture in the displayed representation of the head and/or of the spectacle frame alignment in the displayed representation of the head with the spectacle frame.

In other aspects, apparatuses like the above apparatus are also made available for the other aspects of the methods.

By means of such an apparatus, an intuitive correction of spectacle parameters can be performed, in the same way as has already been explained above for methods according to the disclosure.

The apparatus can additionally comprise an image-recording device in order to record images of the person's head, on the basis of which images the representation of the head is then displayed.

The apparatus can in particular be an apparatus for determining centration parameters, wherein the images can then be centration images. Thus, an apparatus for determining centration parameters can be provided with an additional functionality, in order to perform a correction on the basis of the habitual head posture.

The cameras can in particular comprise one or more side cameras for taking lateral images of the head and a front camera for taking frontal images of the head, in order thereby to display the above-explained views of the head as a representation of the head. The side cameras can be arranged at an angle of approximately 90°, or even less than 90°, to the front camera. The frontal images and the lateral images of the head are typically taken at the same time, which has the effect that the head posture of the person is the same in these images. The images can in particular be taken when the spectacle frame is being worn.

Setting aside the abovementioned additions to the method, the apparatus can be configured as described in the European patent publication EP 3355100.

Finally, according to a further aspect, a method is made available for producing spectacle lenses using the spectacle parameters corrected by the above methods, in this case in particular the centration parameters or the abovementioned axis position.

The fact of the matter is that the optical power of a spectacle lens is optimal in the wearing situation. This means, for example, that the reference point of the spectacle lens "sits" at the correct place after the edging of the round-blank lens (the distance visual point is mostly chosen as reference point). The position of this reference point is given by the variables X and Y, which give the distance to the lower edge and inner edge of the box in mm. The size of the box (the rectangle circumscribing the spectacle lens) is given by the parameters A and B (box length/box height). It is also important to know the angles at which the eye looks through the spectacle lens (pantoscopic angle, face form angle). These are the most important centration parameters according to DIN/EN/ISO13666:2012.

The calculation of the individual spectacle lens uses these centration data, which have been corrected by the methods explained above, in order to calculate the interfaces of the spectacle lens such that the optical power is optimal in the wearing situation (i.e., with the habitual head posture). In contrast to a magnifying glass, for example, the gaze is not "straight" through the lens but instead at an angle (pantoscopic angle and face form angle). In the case of a rotationally symmetrical lens, this leads to imaging aberrations. Therefore, the surfaces of the spectacle lens are calculated as a "free form" in order to obtain the best possible imaging properties for this oblique viewing direction. If the person wearing the spectacles pivots his gaze, then this direction changes in relation to the spectacle lenses. The spectacle lens calculation takes into account this viewing direction that is individual for each visual point (on the basis of the centration data) in order thereby to achieve the largest possible viewing field through the spectacle lens. The spectacle lenses thus calculated are then produced. Correspondingly, the correction of the axis position or of other spectacle parameters can also be taken into consideration in the production of the spectacle lens.

BRIEF DESCRIPTION OF THE DRAWINGS

The disclosure is explained in greater detail below on the basis of exemplary embodiments and with reference to the accompanying drawing, in which.

DESCRIPTION OF EXEMPLARY EMBODIMENTS

Figure 1A:
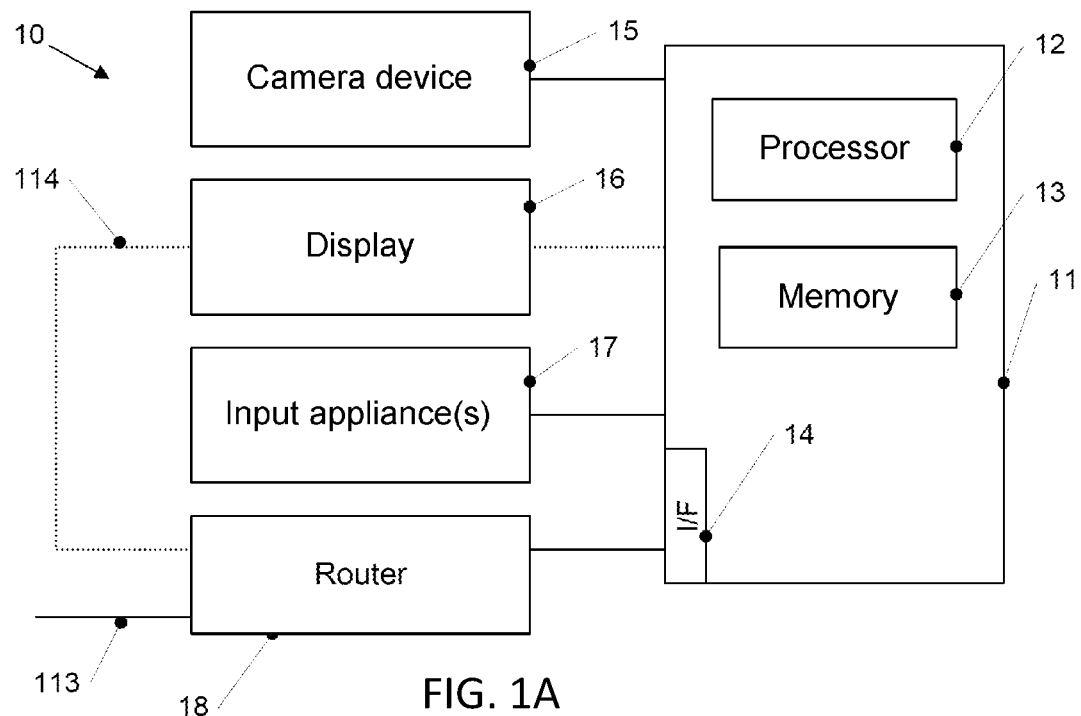
FIG. 1A shows a schematic view of an apparatus according to an exemplary embodiment.

FIG. 1A shows an apparatus for determining centration parameters according to an exemplary embodiment. Apart from the correction described in detail hereinabove and hereinbelow and based on a habitual head posture, the apparatus of FIG. 1A may correspond to a conventional apparatus for the determination of centration parameters, in particular the apparatus disclosed in the European patent publication EP 3355100. The apparatus of FIG. 1A has a computing device 11 with one or more processors 12 and with a memory 13. The memory 13 comprises a read only memory (ROM), a random access memory (RAM) and/or mass storage appliances such as hard disks or optical drives. The memory 13 contains one or more programs which, when executed on the processor 12, perform a determination of centration parameters, including the corrections described hereinabove and hereinbelow and based on a habitual head posture.

For this purpose, in particular a representation of the head is presented, as described, on a display 16. The user can make inputs via one or more input appliances 17, in particular a keyboard or mouse. In exemplary embodiments, the display 16 is additionally or alternatively configured as a touch-sensitive screen (touch screen), such that inputs can also be made directly via the display.

By means of the one or more input appliances 17, manual corrections of the head posture of the displayed representation of the head can then be made as described above according to the habitual head posture, in order then to suitably correct previously determined centration parameters or to determine them on the basis of the habitual head posture.

The computing device 11 moreover has a network interface 14 with which data can be received from a network via a router 18 or can be sent to the network. Here, corrected centration parameters in particular can be sent to other devices that require these. By way of the router, the display 16 can also be coupled to the computing device 11 via a wireless network instead of by a wired coupling, as indicated by a dotted line 114. In this case, the display 16 is typically a tablet computer.

Finally, the apparatus of FIG. 1A comprises a camera device 15. The camera device 15 is used to record one or more images of a person who is to be examined, wherein the person wears a spectacle frame into which spectacle lenses are to be fitted. Centration parameters are then determined on the basis of these images. In these image recordings, the person may adopt a head posture that differs from their habitual head posture. This can be corrected by the methods described hereinabove and hereinbelow.

Figure 1B:
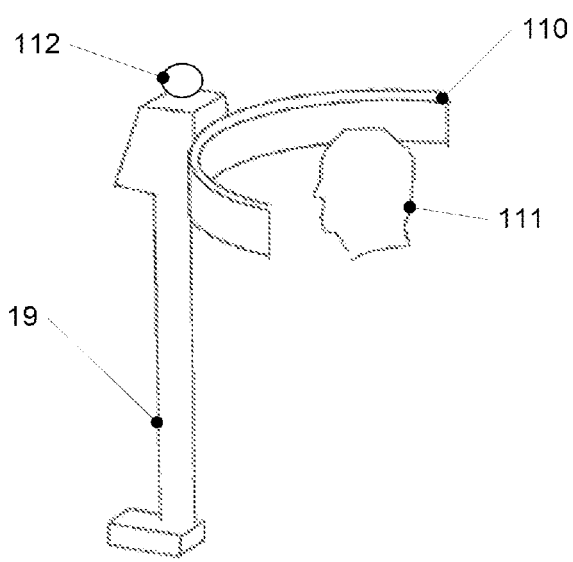
FIG. 1B shows a schematic view of an apparatus according to an exemplary embodiment.

One example of such a camera device 15 is shown in FIG. 1B. In the camera device of FIG. 1B, an arc 110, in which a multiplicity of cameras are arranged, is mounted on a column 19. With these cameras, it is then possible to record front and side images of a head 111 of a person who is to be examined.

The abovementioned head representations are then initially displayed in accordance with the head posture of the head 111 in this recording. Deviations of this head posture from the habitual head posture can then be corrected.

Figure 2:
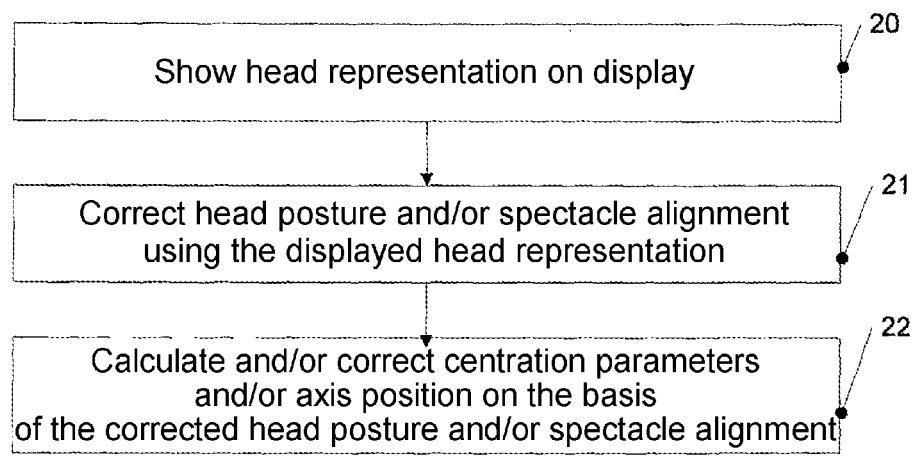
FIG. 2 shows a flow diagram of a method according to an exemplary embodiment.

FIG. 2 shows a flow diagram illustrating a method according to an exemplary embodiment.

The method of FIG. 2 can be carried out for example in the apparatus of FIGS. 1A and 1B, when the processor 12 is programmed accordingly by means of a computer program. However, the method of FIG. 2 can also be carried out by means of other apparatuses.

In step 20 of FIG. 2, a representation of the head is shown on the display 16 of FIG. 1A. This representation of the head shows in particular the head posture when recording images to determine centration parameters, i.e., the head posture of the person in the position shown in FIG. 1B.

In step 21, the head posture is corrected with the aid of the displayed representation of the head. In particular, a vertical head inclination (tilting forward) and/or a lateral inclination of the head can be adapted to an actual habitual head posture, as seen by a user, for example an optician, when observing the person. Moreover, a position of the spectacles, in particular a skew position of the spectacles, can also be marked in the displayed representation of the head.

In step 22, centration parameters and/or an axis position of a spherocylindrical refraction are then corrected on the basis of the corrected head posture and/or the position of the spectacles.

Examples for steps 20-22 of FIG. 2 are now explained in greater detail with reference to FIGS. 3-9.

FIGS. 3-9 show views of the kind that can be shown on the display 16 of FIG. 1A in the course of carrying out the method of FIG. 2. In FIGS. 3-9, identical reference signs designate elements which correspond to each other and which are not explained over again.

Figure 3:
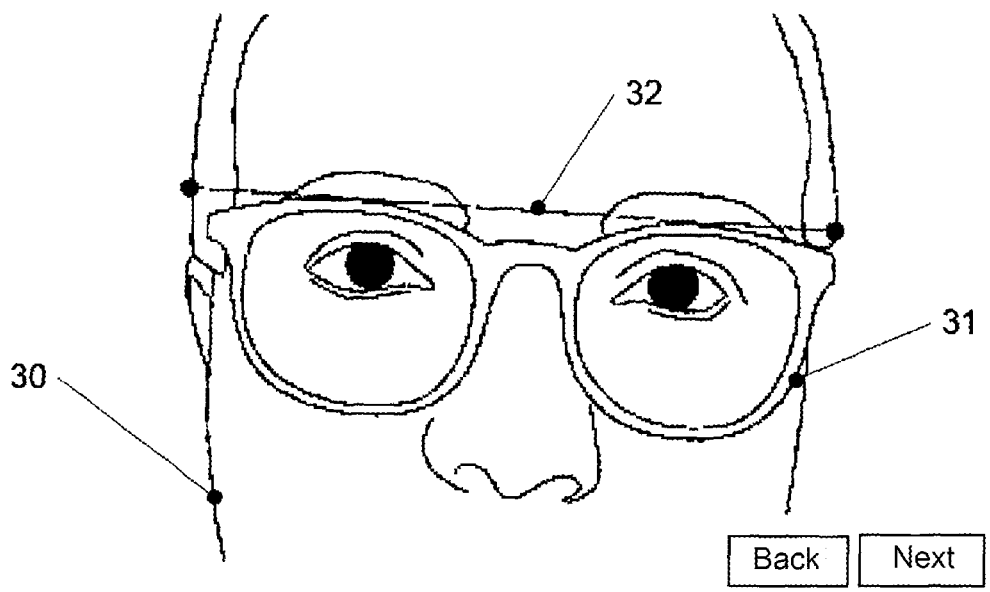
FIG. 3 shows a schematic view of a display during the implementation of a method according to the disclosure.

FIG. 3 shows a representation of a head 30 in a front view, together with a spectacle frame 31 worn on the head 30. In this case, the spectacle frame 31 is laterally inclined relative to a horizontal, which can be caused, for example, by a lateral head inclination as shown in the image or by a spectacle frame that is worn at an angle for anatomical or cosmetic reasons. As is shown, a user can mark the direction of the spectacle frame by a line 32, which designates the frame horizontal. An axis position, which has been determined for the spherocylindrical refraction of the eyes of the person, is then corrected, in the displayed lateral inclination of the head, by an angle which corresponds to the deviation of the line 32 from the horizontal.

Figure 4:
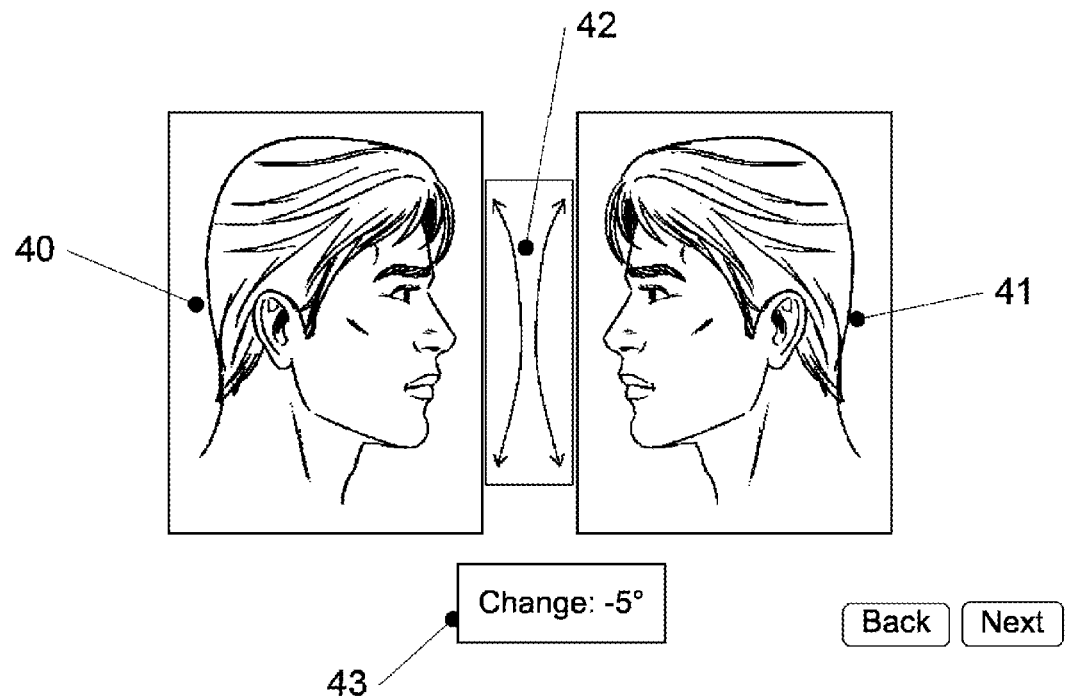
FIG. 4 shows another schematic view of a display during the implementation of a method according to the disclosure.

FIG. 4 shows a display on a screen, in which two side views 40, 41 of a head are shown as a representation of the head. The head posture in the side views 40, 41 corresponds to the head posture of the head 111 when recording images with the camera device of FIG. 1B. A user, for example an optician, can then change the vertical head inclination by swiping in the region 42 (in the case of a touch-sensitive screen) or by moving a mouse pointer in the region 42, whereupon the side views 40, 41 change accordingly. In this way, the head posture can be easily brought into line with an observed habitual head posture of the person. The change of the vertical head inclination is then indicated in a field 43. If the user is satisfied with the result, he can confirm the selection, after which defined centration parameters are corrected on the basis of the changed habitual head posture displayed.

Figure 5:
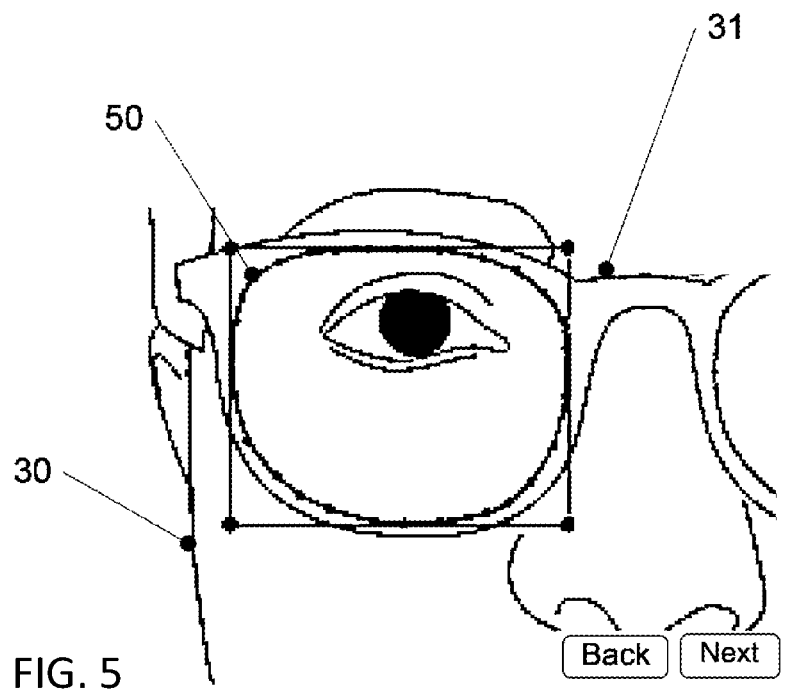
FIG. 5 shows yet another schematic view of a display during the implementation of a method according to the disclosure.

FIG. 5 illustrates a step in the determination of centration parameters. To determine the centration parameters, a frame edge 50 of the spectacle frame 31 is identified by image detection methods. This is described in EP3355104, for example. The position of the spectacle lens is known from the identification of the frame edge 50. With additional knowledge of the position of the pupils, centration parameters such as the distance visual point can then be determined, wherein these centration parameters are corrected on the basis of the head posture that is corrected for example as in FIG. 4.

Figure 6:
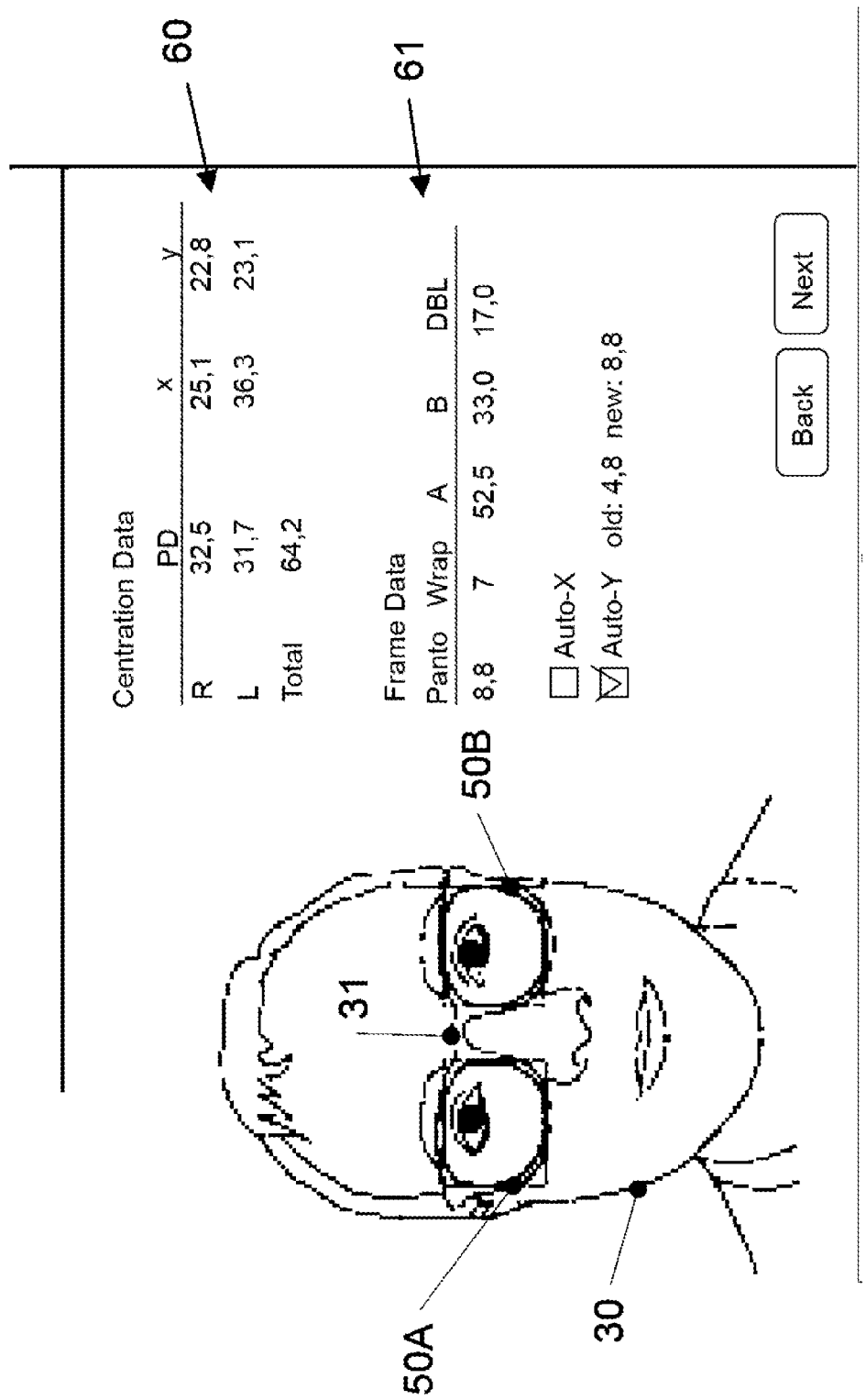
FIG. 6 shows a schematic view of a display during the implementation of a method according to the disclosure.

These centration parameters are then indicated for example in the manner shown in FIG. 6. Here, the head 30 with the spectacle frame 31 is shown in a front view, wherein the left and right spectacle edges 50A, 50B are marked. Centration parameters are indicated in a field 60, and data relating to the spectacle frame are indicated in a field 61. By means of a field "Auto-Y," it is possible to choose between an indication of the uncorrected centration parameters and an indication of the parameters corrected by the methods described here. In other displays, this field "Auto-Y" can also be omitted.

Figure 7:
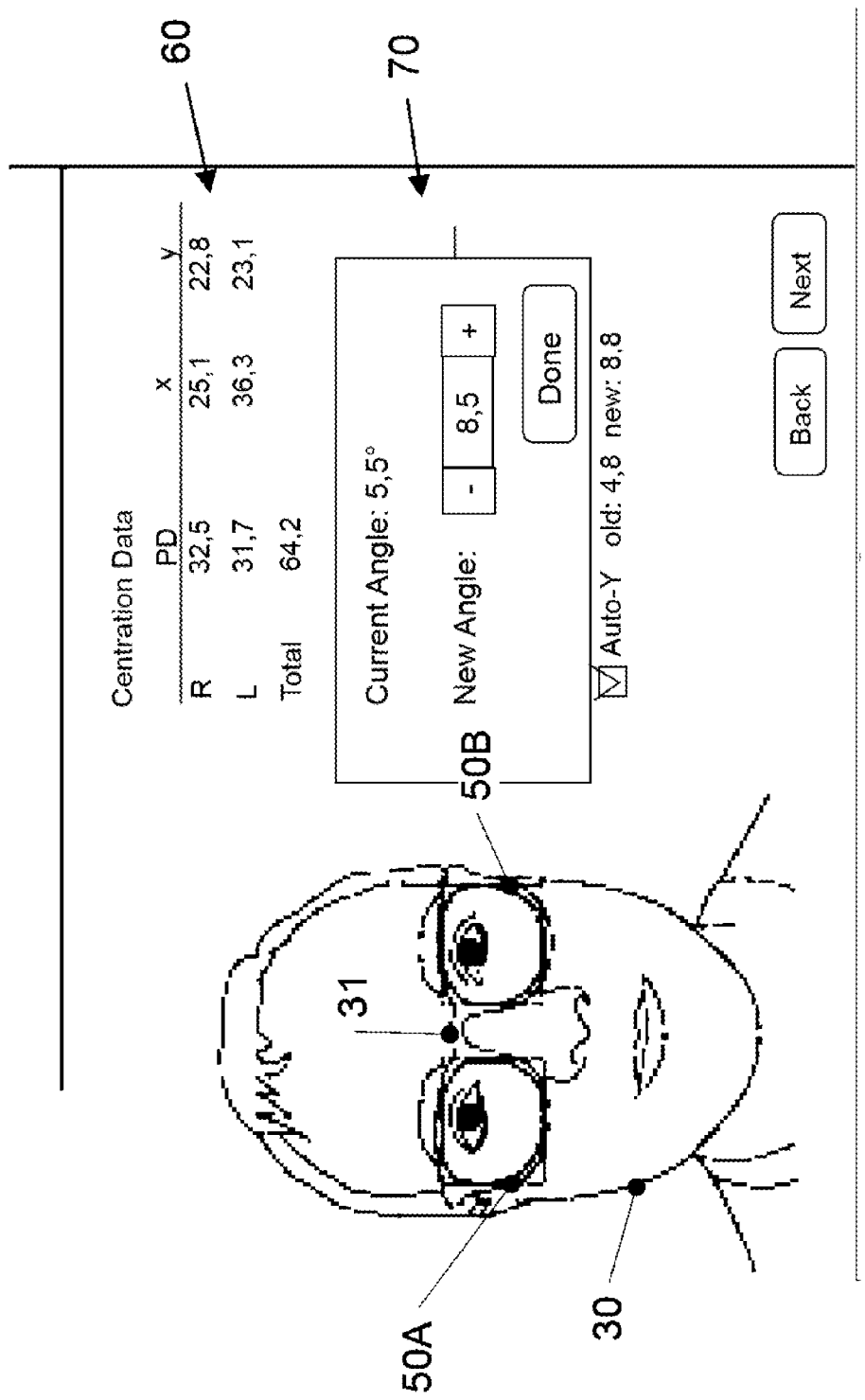
FIG. 7 shows another schematic view of a display during the implementation of a method according to the disclosure.
Figure 8:
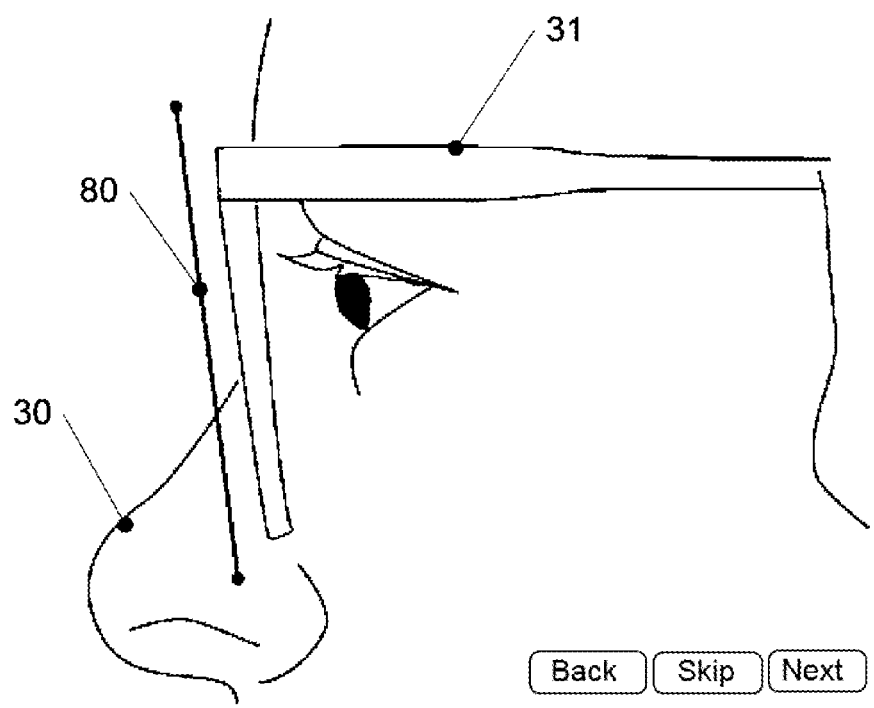
FIG. 8 shows yet another schematic view of a display during the implementation of a method according to the disclosure.

In the approach set out in FIGS. 4-6, the indicated head posture in FIG. 4 is first of all corrected in such a way that it corresponds to the habitual head posture, before the centration data (corrected according to the habitual head posture) are shown in FIG. 6. Additionally or alternatively, the indicated head inclination can also be adjusted afterwards, as is shown in FIG. 7. Here, the head inclination, i.e., the vertical head inclination, can be adjusted in a field 70, which in turn can be monitored directly by the display of the head 30 as representation of the head. The centration data in the field 60 are then correspondingly corrected. Such a field 70 can also be provided in other variants, e.g., in the example of FIG. 6.

The pantoscopic angle of the spectacle frame (compare section 5.18 of DIN EN ISO 13666:2012) can also be set. This is shown in more detail in FIG. 8, wherein the forward inclination of the spectacle frame 31 can be marked by means of a line 80 and thus set. The pantoscopic angle depends inter alia on the vertical inclination of the head. Thus, the vertical head inclination can also be set by changing the pantoscopic angle.

Figure 9:
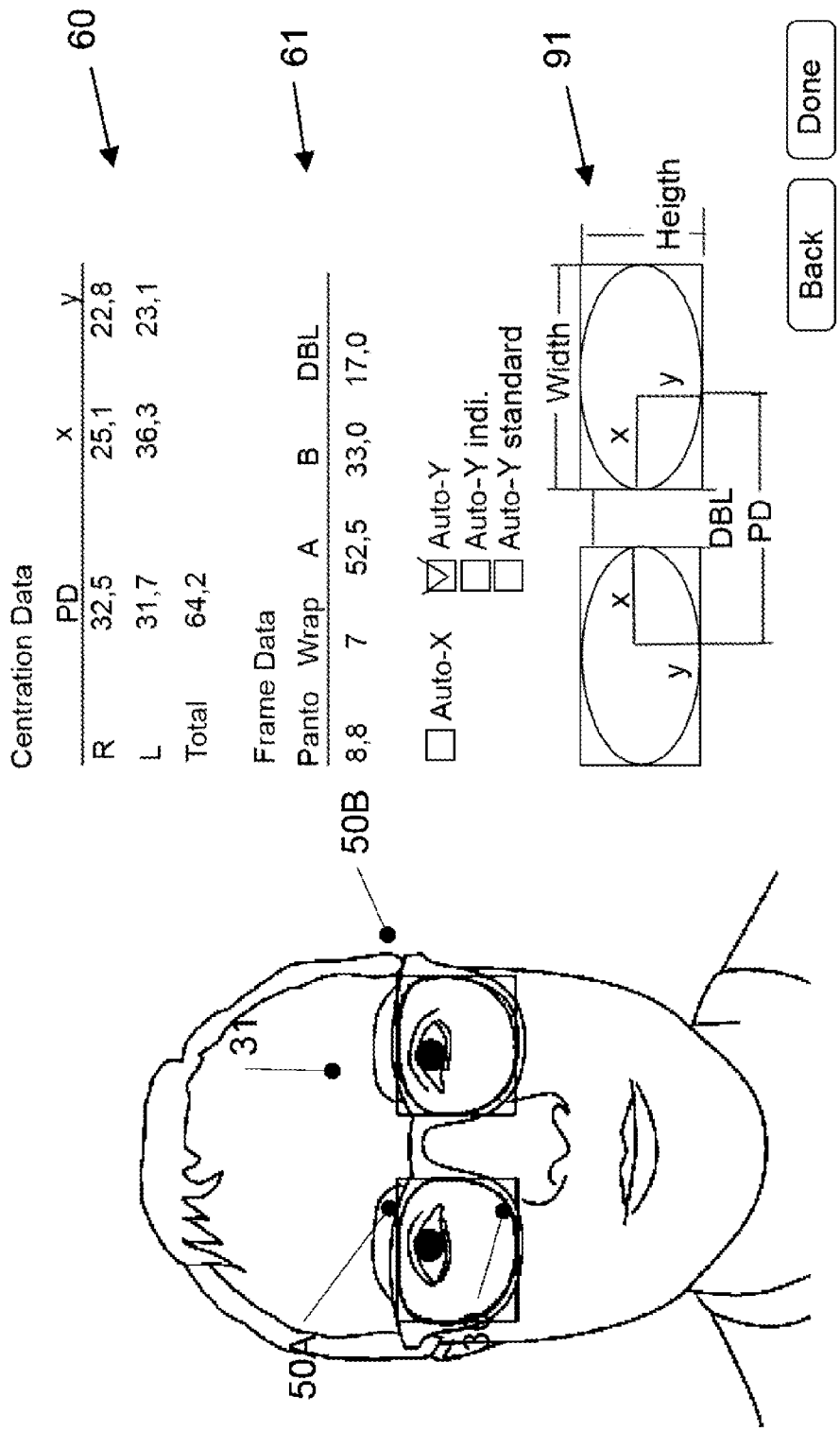
FIG. 9 shows a schematic view of a display during the implementation of a method according to the disclosure.

FIG. 9 shows an alternative screen display in which, in addition to the centration data 60 and the frame data 61, the centration parameters are shown in graph form in a field 91. Moreover, in the exemplary embodiment of FIG. 9, a field "Auto Y" can be set to "90," whether a correction of the indicated head inclination is intended to be carried out or whether only an automatic determination of the centration parameters without such a correction takes place. In other displays, this field "Auto Y" can also be omitted, and the field 70 of FIG. 7 can instead be provided, for example. The latter can be set automatically or manually if the user has not made any change beforehand to the vertical head inclination of the test subject, because the head of the person in the image recording as in FIG. 1B has already adopted the correct head posture, i.e., in particular the habitual head posture.

Figure 10:
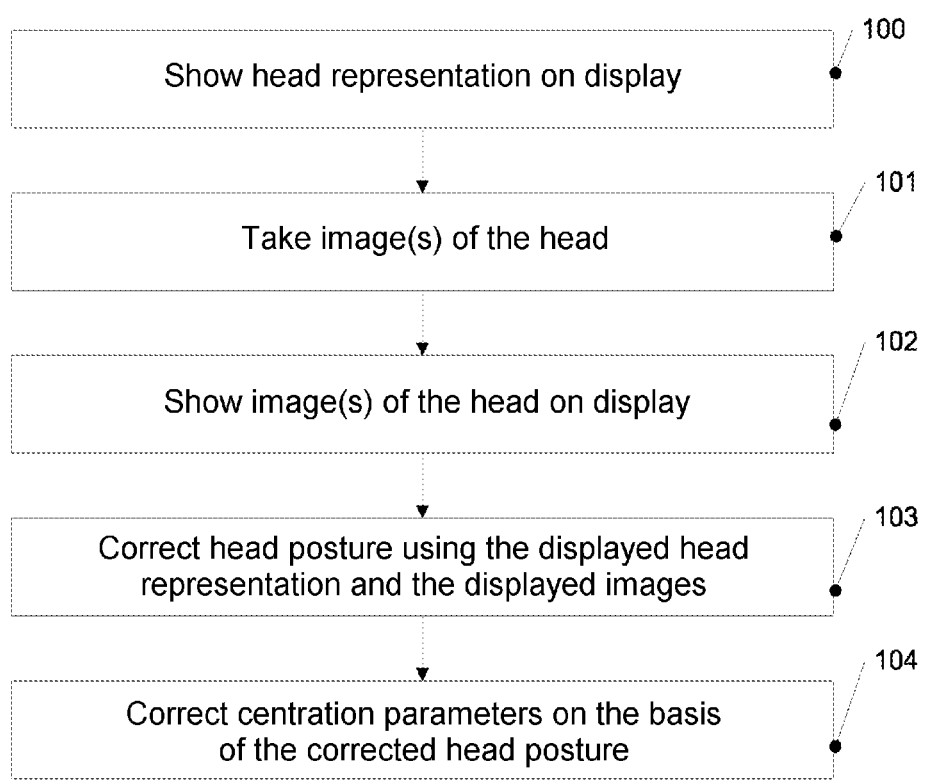
FIG. 10 shows a flow diagram of a method according to an exemplary embodiment.

FIG. 10 shows a flow diagram of a method according to a further exemplary embodiment. Like the method of FIG. 2, the method of FIG. 10 can also be carried out by means of the apparatus of FIGS. 1A and 1B, wherein in this case the camera device 15 comprises an additional camera (for example a camera of a smart phone) by means of which one or more images of the person can be recorded, in particular as a video.

In step 100 of the method of FIG. 10, a representation of the head is shown on a display, as has already been described. Moreover, in step 101, one or more images, in particular live images (i.e., instantaneous images), of the head are recorded. These live images record the person with their actual head posture, which corresponds to the habitual head posture, optionally for various activities as already described above. In step 102, the images recorded in step 101 are shown on the display, such that the representation of the head can be brought into line with the recorded images. This additionally facilitates the setting that has been described, for example, with reference to FIG. 4. Alternatively or additionally, an automatic adaptation can take place in step 103 by identification of prominent points, as has likewise been described above. In step 104, centration parameters are then corrected on the basis of the corrected head posture, as has already been described.

Figure 11A:
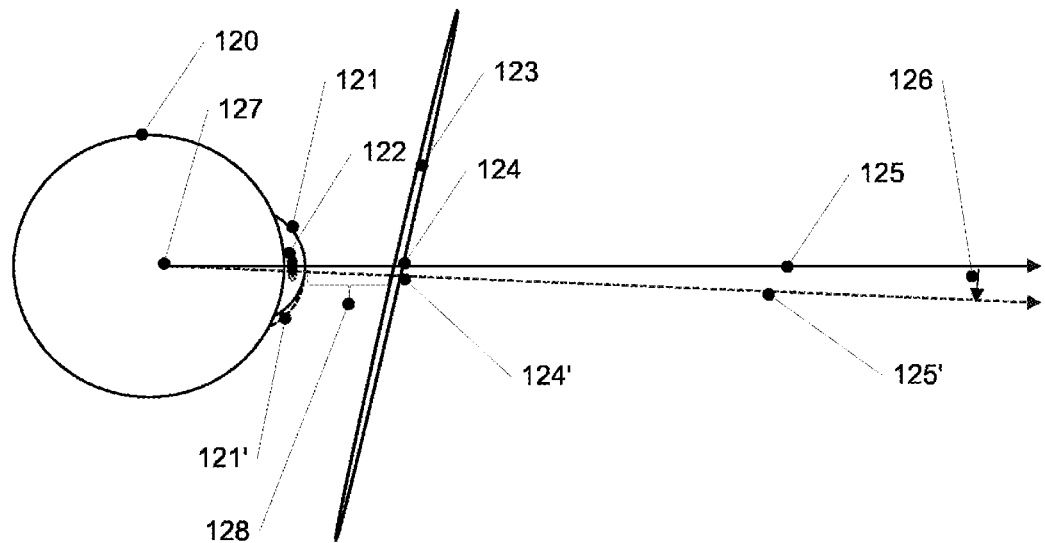
FIG. 11A shows a diagram illustrating the correction of a visual point in accordance with the inclination of the head.
Figure 11B:
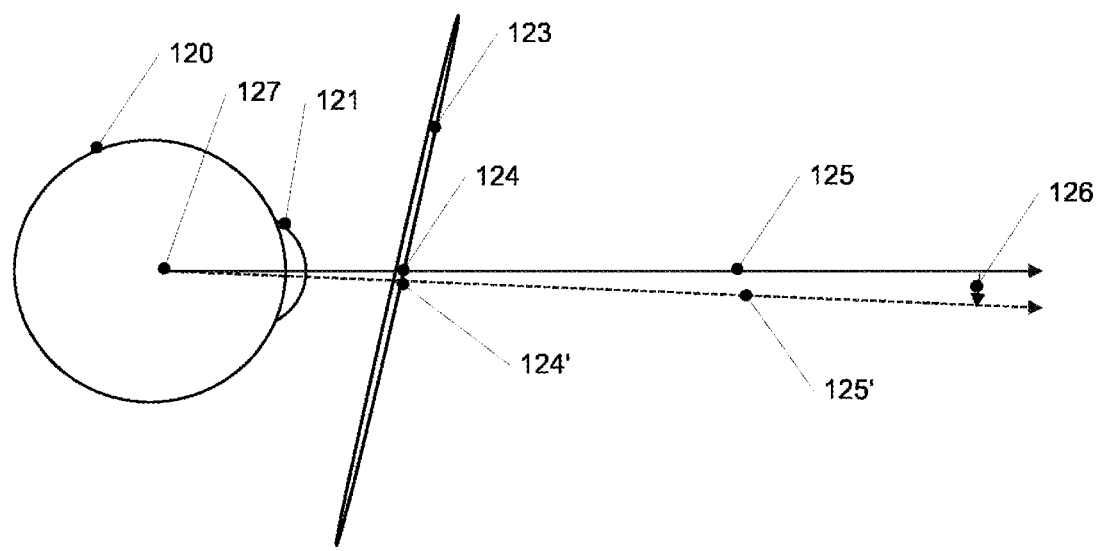
FIG. 11B shows a diagram illustrating the correction of a visual point in accordance with the inclination of the head.

An example of this correction of centration parameters is shown in FIGS. 11A and 11B for the correction of the visual point, wherein FIG. 11B shows a simplified model compared to FIG. 11A.

FIGS. 11A and 11B each show an eye 120 with a cornea 121 schematically. FIG. 11A additionally shows a pupil 122 of the eye 120. The center of rotation (COR) of the eye 120 is designated by the reference sign 127. The center of rotation 127 of the eye typically lies 11-15 mm, e.g., 12.5 mm, behind the cornea 127. Instead of the center of rotation of the eye, it is also possible to use the geometric center of the eye, which approximately coincides with the center of rotation of the eye.

FIGS. 11A and 11B moreover show a spectacle lens 123 through which the eye 120 looks.

Reference sign 125 designates a viewing direction in the determination of the centration parameters, which leads to a visual point 124. The reference sign 125' designates a viewing direction that has been corrected by a correction angle 126 of the person. This correction angle was determined, as described above, according to a correction of the head inclination. In FIG. 11A, an altered position of the cornea according to the viewing direction 125' is additionally designated by 121'. This viewing direction 125' is then accordingly assigned a corrected visual point 124' as an example of a corrected centration parameter.

The plane of the spectacle lens 123 is determined, during the determination of the centration parameters, as described in EP3355104.

In the approach in FIG. 11A, the three-dimensional position of the visual point 124' is determined as a section between the viewing direction 125' and this plane. The two-dimensional shift of the visual point from 124 to 124' can be determined from the distance of the center of rotation 127 of the eye from the visual point 124, which distance contains the vertex distance 128, from the correction angle 126 and from the forward inclination of the spectacle lens 123, by simple geometric calculations as is evident from FIG. 11A. The vertex distance 128 is determined in the determination of the centration parameters.

In FIG. 11B, the viewing direction 125 is established, in the determination of the centration parameters, through a so-called view target on the corresponding apparatus as shown in FIG. 1B. A view target is understood as a component at which the person is intended to look during the determination of the centration parameters. The visual point 124 then derives in turn from the section of this viewing direction 125 with the plane of the spectacle lens 123, and the corrected visual point 124' is then determined by changing this viewing direction 125, according to the correction angle 126', to the viewing direction 125' and the section of this viewing direction 125' with the plane of the spectacle lens 123.

The following examples may illustrate one or more aspects of the disclosure.

Example 1

A method for correcting a spectacle parameter, comprising:
displaying (20) a representation (30; 40, 41) of the head in a head posture or a representation of the head with a spectacle frame in a spectacle frame alignment (32), and
correcting (22) the spectacle parameter on the basis of a corrected head posture and/or on the basis of a corrected spectacle frame alignment,
characterized in that the corrected head posture and/or the corrected spectacle frame alignment is determined by:
at least partially manual correction (21) of the head posture in the displayed representation (30; 40, 41) of the head and/or of the spectacle frame alignment (32) in the displayed representation (30; 40, 41) of the head with the spectacle frame.

Example 2

The method as per example 1, characterized in that the spectacle parameter comprises a centration parameter and/or an axis position of a spherocylindrical refraction.

Example 3

The method as per example 2, characterized in that the displayed representation (30; 40, 41) of the head indicates the head posture in a recording when determining the centration parameter or when determining the spherocylindrical refraction and/or
the displayed representation of the head with the spectacle frame indicates the spectacle frame alignment (32) in a recording when determining centration parameters or in a head posture when determining a spherocylindrical refraction.

Example 4

The method as per one of examples 1-3, characterized in that the display (20) of the representation of the head comprises at least one from the following group:
displaying at least one side view (40, 41) of the head, wherein the correction of the head posture comprises an adjustment of a vertical head inclination of the at least one side view (40, 41),
displaying a 3D head representation, wherein the correction of the head posture comprises an alignment of the displayed 3D representation,
displaying a front view (30) of the head, wherein the correction of the head posture comprises setting a lateral inclination of the head,
displaying a front view (30) of the head with a spectacle frame (31) in place, wherein the correction of the spectacle frame alignment (31) comprises marking (32) of the spectacle frame alignment in the displayed representation of the head.

Example 5

The method as per example 4, characterized in that the spectacle parameter comprises an axis position of a spherocylindrical refraction, and in that the correction comprises a correction of the axis position according to the lateral head inclination and/or the marked spectacle frame alignment.

Example 6

The method as per one of examples 1-5, characterized in that the correction (22) of the head posture comprises an input of an angle characterizing the head posture, wherein the method further comprises:
changing the display of the representation of the head (30; 40, 41) depending on the angle that is input.

Example 7

The method as per one of examples 1-6, characterized in that the method further comprises recording (101) at least one image of the person, wherein the correction of the head posture is carried out on the basis of the at least one image and the representation of the head.

Example 8

The method as per example 7, characterized in that the correction of the head posture comprises an identification of points in the at least one image and in the representation of the head that correspond to one another.

Example 9

The method as per one of examples 1-8, wherein the spectacle parameter comprises an axis position of a spherocylindrical refraction, and wherein the correction of the axis position takes place on the basis of a registration of the irises of the eyes in an image of the head when determining the spherocylindrical refraction and the irises of the eyes in an image of the head when measuring a centration parameter.

Example 10

A computer program comprising a program code which, when executed on a processor (12), causes the method as claimed in one of claims 1-9 to be carried out.

Example 11

A computer (10) for correcting a spectacle parameter, comprising:
a processor (12) and
a memory (13) with a computer program as claimed in claim 11 that is stored therein and is executed on the processor (12).

Example 12

An apparatus for correcting a spectacle parameter, comprising:
display means (16) for displaying (20) a representation (30; 40, 41) of a head in a head posture or a representation of the head with a spectacle frame in a spectacle frame alignment (32), and
correction means (12) for correcting (22) the spectacle parameter on the basis of a corrected head posture and/or on the basis of a corrected spectacle frame alignment,
characterized by input means (17) for determining the corrected head posture and/or the corrected spectacle frame alignment by:
at least partial manual correction (21) of the head posture in the displayed representation (30; 40, 41) of the head and/or of the spectacle frame alignment (32) in the displayed representation (30; 40, 41) of the head with the spectacle frame.

Example 13

The apparatus (10) as per example 12, wherein the correction means comprise a processor (12), and
the apparatus furthermore comprises a computer program as claimed in claim 11 for executing on the processor (12).

Example 14

The apparatus (10) as per example 12 or 13, characterized in that the apparatus further comprises an image-recording device (15) for recording one or more centration images for determining centration parameters, wherein the representation of the head is displayed depending on the one or more centration images.

Example 15

The apparatus as per example 14, characterized in that the image-recording device (15) comprises a front camera and at least one side camera, wherein the front camera and the at least one side camera are configured to record images of the head at the same time.

The invention claimed is:

1. A computer-implemented method for correcting a spectacle parameter, the method comprising:
obtaining a spherocylindrical refraction of a person including an axis position with the head of the person being in a first head posture;
displaying a representation of the head in the first head posture or a representation of the head in the first head posture with a spectacle frame in a first spectacle frame alignment;
determining at least one of a corrected head posture or a corrected spectacle frame alignment by at least partially manually correcting at least one of the first head posture in the displayed representation of the head towards a habitual head posture or of the first spectacle frame alignment in the displayed representation of the head with the spectacle frame towards a habitual spectacle frame alignment;
determining an angle of inclination of the head of the person in the corrected head posture compared to the first head posture or the angle of inclination between the first spectacle frame alignment and the corrected spectacle frame alignment;
obtaining a corrected axis position of the spherocylindrical refraction by correcting the provided axis position of the spherocylindrical refraction in an amount corresponding to the determined angle of inclination; and
providing the corrected axis position of the spherocylindrical refraction for a production of a spectacle lens.

2. The method as claimed in claim 1, wherein the spectacle parameter comprises a centration parameter.

3. The method as claimed in claim 1, wherein the displaying is effected with a display means.

4. The method as claimed in claim 1, further comprising:
effecting the at least partially manual correction with input means,
wherein the representation of the head provides a visual aid for the at least partially manual correction.

5. The method as claimed in claim 1, wherein the displaying of the representation of the head comprises at least one from the following group:
displaying at least one side view of the head, wherein the correction of the head posture includes an adjustment of a vertical head inclination of the at least one side view;
displaying a 3D head representation, wherein the correction of the head posture includes an alignment of the displayed 3D representation;
displaying a front view of the head, wherein the correction of the head posture includes setting a lateral inclination of the head; or
displaying the front view of the head with the spectacle frame in place, wherein the correction of the spectacle frame alignment includes marking the spectacle frame alignment in the displayed representation of the head.

6. The method as claimed in claim 5, wherein the correction includes a correction of the axis position according to at least one of the lateral head inclination or the marked spectacle frame alignment.

7. The method as claimed in claim 1, wherein the correction of the head posture comprises an input of an angle characterizing the head posture, and wherein the method further comprises:
changing the display of the representation of the head depending on the angle that is input.

8. The method as claimed in claim 1, wherein the method further comprises:

recording at least one image of the person, wherein the correction of the head posture is carried out based on the at least one image and the representation of the head.

9. The method as claimed in claim 8, wherein the correction of the head posture comprises an identification of points in the at least one image and in the representation of the head that correspond to one another, respectively.

10. The method as claimed in claim 1, wherein a correction of the axis position includes on the basis of a registration of the irises of the eyes in an image of the head when determining the spherocylindrical refraction and the irises of the eyes in the image of the head when measuring a centration parameter.

11. A method for producing spectacle lenses utilizing the spectacle parameters corrected by the method as claimed in claim 1.

12. A computer-implemented method for correcting a spectacle parameter, comprising:
- obtaining a spectacle parameter configured to adapt spectacles to a head of a person with the head of the person being in a first head posture;
- displaying a representation of the head in the first head posture or a representation of the head with a spectacle frame in a first spectacle frame alignment;
- determining an angle of inclination of the head of the person in the corrected head posture compared to the first head posture or the angle of inclination between the first spectacle frame alignment and the corrected spectacle frame alignment,
  - wherein the spectacle parameter includes an axis position of a spherocylindrical refraction, and wherein the correction of the axis position includes a registration of the irises of the eyes in an image of the head when determining the spherocylindrical refraction and the irises of the eyes in an image of the head in the first head posture when measuring a centration parameter;
- obtaining a corrected axis position of the spherocylindrical refraction by correcting the obtained axis position of the spherocylindrical refraction in an amount of the determined angle of inclination; and
- providing the corrected axis position of the spherocylindrical refraction for a production of a spectacle lens.

13. A computer-readable non-transitory storage medium comprising a computer program for correcting a spectacle parameter and having a program code which, when executed on a processor, causes a method of:
- obtaining a spherocylindrical refraction of a person including an axis position with the head of the person being in a first head posture;
- displaying a representation of the head in the first head posture or a representation of the head in the first head posture with a spectacle frame in a first spectacle frame alignment;
- determining an angle of inclination of the head of the person in the corrected head posture compared to the first head posture or the angle of inclination between the first spectacle frame alignment and the corrected spectacle frame alignment,
- wherein the spectacle parameter includes an axis position of a spherocylindrical refraction, and wherein the correction of the axis position includes a registration of the irises of the eyes in an image of the head when determining the spherocylindrical refraction and the irises of the eyes in an image of the head in the first head posture when measuring a centration parameter;
- obtaining a corrected axis position of the spherocylindrical refraction by correcting the obtained axis position of the spherocylindrical refraction in an amount of the determined angle of inclination; and
- providing the corrected axis position of the spherocylindrical refraction for a production of a spectacle lens,
to be carried out.

14. A computer for correcting a spectacle parameter, comprising:
- a processor; and
- a memory with a computer program comprising instructions which, upon execution of the program by a computer, cause the computer to carry out a method of:
  - obtaining the spectacle parameter configured to adapt spectacles to a head of a person with the head of the person being in a first head posture;
  - displaying a representation of the head in the first head posture or a representation of the head with a spectacle frame in a first spectacle frame alignment;
  - determining an angle of inclination of the head of the person in the corrected head posture or the angle of inclination between the first spectacle frame alignment and the corrected spectacle frame alignment,
  - wherein the spectacle parameter includes an axis position of a spherocylindrical refraction, and wherein the correction of the axis position includes a registration of the irises of the eyes in an image of the head when determining the spherocylindrical refraction and the irises of the eyes in an image of the head in the first head posture when measuring a centration parameter;
  - obtaining a corrected axis position of the spherocylindrical refraction by correcting the obtained axis position of the spherocylindrical refraction in an amount of the determined angle of inclination; and
  - providing the corrected axis position of the spherocylindrical refraction for a production of a spectacle lens.

15. A computer-readable non-transitory storage medium comprising instructions for correcting a spectacle parameter which, upon execution by a computer, cause the computer to carry out a method of:
- obtaining a spherocylindrical refraction of a person including an axis position with the head of the person being in a first head posture;
- displaying a representation of the head in the first head posture or a representation of the head in the first head posture with a spectacle frame in a first spectacle frame alignment;
- determining at least one of a corrected head posture or a corrected spectacle frame alignment by at least partially manually correcting at least one of the first head posture in the displayed representation of the head towards a habitual head posture or of the first spectacle frame alignment in the displayed representation of the head with the spectacle frame towards a habitual spectacle frame alignment;
- determining an angle of inclination the head of the person in the corrected head posture compared to the first head posture or the angle of inclination between the first spectacle frame alignment and the corrected spectacle frame alignment;
- obtaining a corrected axis position of the spherocylindrical refraction by correcting the provided axis position of the spherocylindrical refraction in an amount corresponding to the determined angle of inclination; and
- providing the corrected axis position of the spherocylindrical refraction for a production of a spectacle lens.

16. A computer for correcting a spectacle parameter, comprising:
- a processor; and
- a memory with a computer program stored therein, the computer program being configured to be executed on the processor to:
- obtain a spherocylindrical refraction of a person including an axis position with the head of the person being in a first head posture;
- display a representation of the head in the first head posture in the first head posture or a representation of the head in the first head posture with a spectacle frame in a first spectacle frame alignment;
- determine at least one of a corrected head posture or a corrected spectacle frame alignment by at least partially manually correcting at least one of the first head posture in the displayed representation of the head towards a habitual head posture or of the first spectacle frame alignment in the displayed representation of the head with the spectacle frame towards a habitual spectacle frame alignment;
- determine an angle of inclination of the head of the person in the corrected head posture compared to the first head posture or the angle of inclination between the first spectacle frame alignment and the corrected spectacle frame alignment;
- obtain a corrected axis position of the spherocylindrical refraction by correcting the obtained axis position of the spherocylindrical refraction in an amount corresponding to the determined angle of inclination; and
- provide the corrected axis position of the spherocylindrical refraction for a production of a spectacle lens.

17. An apparatus for correcting a spectacle parameter, the apparatus comprising:
- obtaining means for obtaining an axis position of a spherocylindrical refraction of a person with the head of the person being in a first head posture;
- display means for displaying a representation of the head of the person in a first head posture or a representation of the head in the first head posture with a spectacle frame in a first spectacle frame alignment;
- input means for determining the at least one of the corrected head posture or the corrected spectacle frame alignment by:
  - an at least partial manual correction of at least one of the first head posture in the displayed representation of the head towards a habitual head posture or of the spectacle frame alignment in the displayed representation of the head with the spectacle frame towards a habitual spectacle frame alignment;
- determining means for determining an angle of inclination of the head of the person in the corrected head posture compared to the first head posture or the angle of inclination between the first spectacle frame alignment and the corrected spectacle frame alignment;
- obtaining means for obtaining a corrected axis position of the spherocylindrical refraction by correcting the obtained axis position of the spherocylindrical refraction in an amount corresponding to the determined angle of inclination; and
- provision means for providing the corrected axis position of the spherocylindrical refraction for a production of a spectacle lens.

18. The apparatus as claimed in claim 17, wherein the apparatus further comprises an image-recording device for recording one or more centration images for determining centration parameters, and wherein the representation of the head is displayed depending on the one or more centration images.

19. The apparatus as claimed in claim 18, wherein the image-recording device comprises a front camera and at least one side camera, and wherein the front camera and the at least one side camera are configured to record images of the head at the same time.

* * * * *